OR  3,827,784

United States
Giglia et al.

[11] 3,827,784
[45] Aug. 6, 1974

[54] SIMPLE, BONDED GRAPHITE COUNTER ELECTRODE FOR ELECTROCHROMIC DEVICES

[75] Inventors: Robert Domenico Giglia, Rye, N.Y.; Richard Howard Clasen, West Redding, Conn.

[73] Assignee: American Cyanamid Company, Stamford, Conn.

[22] Filed: Dec. 9, 1971

[21] Appl. No.: 206,419

[52] U.S. Cl. .............................................. 350/160 P
[51] Int. Cl. .............................................. G02f 1/36
[58] Field of Search .................................. 350/160

[56] References Cited
UNITED STATES PATENTS

| | | |
|---|---|---|
| 3,283,656 | 11/1966 | Jones et al. .......................... 350/160 |
| 3,443,859 | 3/1969 | Rogers ................................ 350/160 |
| 3,521,941 | 7/1970 | Deb et al. ........................... 350/160 |
| 3,578,843 | 5/1971 | Castellion .......................... 350/160 |

*Primary Examiner*—William L. Sikes
*Attorney, Agent, or Firm*—Charles J. Fickey

[57] ABSTRACT

Method for forming a counter-electrode or imaging area in an electro-optical data display and imaging device, and the electrode and imaging areas formed. An electrochromic data display and imaging device may be formed by sandwich arrangement of the imaging area, the counter-electrode area with a suitable layer between. The device exhibits superior electrochromic reversability and improved speed and cell life over prolonged coloration and erase cycles.

7 Claims, 3 Drawing Figures

PATENTED AUG 6 1974       3,827,784

SIMPLE, BONDED GRAPHITE COUNTER ELECTRODE FOR ELECTROCHROMIC DEVICES

BACKGROUND OF INVENTION

This invention relates to electro-optical devices whose electromagnetic radiation absorption characteristics can be selectively altered by influence of a suitably controlled electric field. More particularly, the invention is concerned with an electro-optical device which contains a layer of electrochromic material, having a greatly simplified and more effective counter-electrode. Still more particularly, this invention is directed to a sandwich type cell in which two layers of electrochromic material are separated by solid, semi-solid or liquid ion conducting media. It particularly relates to a greatly simplified method for forming counter-electrodes and electrochromic layers.

In prior U.S. applications, Ser. No. 530,086 filed Feb. 25, 1966, now abandoned and Ser. No. 534,153 now U.S. Pat. No. 3,414,783 filed Mar. 14, 1966 and continuation-in-part applications thereof, and Ser. No. 41,153 now abandoned filed May 25, 1970 all commonly assigned, there are described electrooptical devices exhibiting a phenomenon known as persistent electrochromism wherein electromagnetic radiation absorption characteristic of a persistent electrochromic material is altered under the influence of an electric field. Such devices were employed in sandwich arrangement between two electrodes. Coloration was induced by charging the electrochromic film negative with respect to the counter-electrode, employing an external potential. The counter-electrode can be the same as the persistent electrochromic material or different.

By reversing the original polarity of the field or by applying a new field, it was also possible to cancel, erase or bleach the visible coloration.

These steps of color induction and erasure are defined as cycling

Although the devices described in the prior applications are effective to change their electromagnetic radiation transmitting properties under the influence of an electric field, the practicality of a simple sandwiched or layered arrangement of electrodes and layer of electrochromic material is somewhat limited due to the complexity in formation or configuration of counter-electrodes. Moreover, prior counter-electrodes did not exhibit high speed switching capability or extended cycle lifetime. In addition, their fabrication was often complicated. Electrochromic layers have previously been vacuum deposited. Counter-electrodes have been formed from vacuum deposited metal layers and also as compacted mixtures of graphite, fibrillated teflon, and an electrochromic material.

This shortcoming has been overcome in the present invention by employing a counter-electrode which is deposited as a layer from a simple soluion or suspension, under ambient conditions.

SUMMARY OF THE INVENTION

An object of the present invention is therefore to provide an improved form of electrochromic device wherein the electrochromic layer and the counter-electrode are simpler and more easily formed. It is, moreover, an object to provide a more effective counter-electrode having improved reversibility and longer useful life.

In the present invention, it has been found that the counter-electrode may be formed of graphite alone or in admixture with the electrochromic material. The graphite is finely divided, high surface area graphite and is mixed with an acid resistant binding agent. The mixture may be in a fluid or powdered form, depending on the state of the binding agent, i.e., fluid or solid. If the mixture is fluid, it is simply applied to a surface by spraying, brushing on, and the like. With a solid, powdered mixture, it is sprinkled on to a surface, for example. After application of the mixture, it is cured by heating. Means are provided for supplying electric current to the counter-electrode layer. Any conventional means is suitable. A particularly advantageous means for electrical connection is to deposit the electrode mixture on a conductive surface, such as NESA glass. When an electrochromic material is included in the counter-electrode, it is also in a finely divided form and is admixed with the graphite and binding agent.

The electrochromic imaging area may also be formed by the above method, except that it is made of the electrochromic material without graphite.

The image display device is formed in a sandwich arrangement of an electrochromic imaging area and a counter-electrode with a spacing layer between the areas. It is particularly advantageous to incorporate an electrochromic material with the counter-electrode which is identical to that used for the imaging area. This provides greater compatability between imaging area and counter-electrode, and allows the device to operate on lower voltage, at increased speed, and for a longer period.

The longer cell life thus achieved, in contrast to the embodiments of the earlier applications, permits commercial applications wherein stringent cell stability and life requirements are imposed. Thus, the invention is applicable to variable reflective mirrors and data display devices for use in protracted service. The field of practical use is widened, moreover, by use of a semi-solid conducting media permitting ease of assembly and minimizing the possibility of premature failure from leakage or evaporation.

The foregoing and other features, objects and advantages of the present invention will become more apparent from the following detailed description.

DETAILED DESCRIPTION OF INVENTION

As used herein, a "persistent electrochromic material" is defined as a material responsive to the application of an electric field of a given polarity to change from a first persistent state in which it is essentially non-absorptive of electromagnetic radiation in a given wave length region, to a second persistent state in which it is absorptive of electromagnetic radiation in the given wave length region, and once in said second state, is responsive to the application of an electric field of the opposite polarity to return to its first state. Certain of such materials can also be responsive to a short circuiting condition, in the absence of an electric field, so as to return to the initial state.

By "persistent" is meant the ability of the material to remain in the absorptive state to which it is changed, after removal of the electric field, as distinguished from a substantially instantaneous reversion to the initial state, as in the case of the Franz-Keldysh effect.

ELECTROCHROMIC MATERIALS

The materials which form the electrochromic materials of the device in general are electrical insulators or semi-conductors. Thus are excluded those metals, metal alloys, and other metal-containing compounds which are relatively good electrical conductors.

The persistent electrochromic materials are further characterized as inorganic substances which are solid under the conditions of use, whether as pure elements, alloys, or chemical compounds, containing at least one element of variable oxidation state, that is, at least one element of the Periodic System which can exist in more than one oxidation state in addition to zero. The term "oxidation state" as employed herein is defined in "Inorganic Chemistry," T. Moeller, John Wiley & Sons, Inc., New York, 1952.

These include materials containing a transition metal element (including Lanthanide and Actinide series elements), and materials containing non-alkali metal elements such as copper. Preferred materials of this class are films of transition metal compounds in which the transition metal may exist in any oxidation state from +2 to +8. Examples of these are: transition metal oxides, transition metal oxysulfides, transition metal halides, selenides, tellurides, chromates, molybdates, tungstates, vanadates, niobates, tantalates, titanates, stannates, and the like. Particularly preferred are films of metal stannates, oxides and sulfides of the metals of Groups (IV)B, (V)B and (VI)B of the Periodic System, and Lanthanide series metal oxides and sulfides. Examples of such are copper stannate, tungsten oxide, cerium oxide, cobalt tungstate, metal molybdates, metal titanates, metal niobates, and the like.

Additional examples of such compounds are the following oxides: MO oxides, e.g., $MnO$, $NiO$, $CoO$, etc.; $M_2O_3$ oxides, e.g., $Cr_2O_3$, $Fe_2O_3$, $Y_2O_3$, $Yb_2O_3$, $V_2O_3$, $Ti_2O_3$, $Mn_2O_3$, etc.; $MO_2$ oxides, e.g., $TiO_2$, $MnO_2$, $ThO_2$, etc.; $M_3O_4$ oxides, e.g., $Co_3O_4$, $Mn_3O_4$, $Fe_3O_4$, etc.; $MO_3$ oxides, e.g., $CrO_3$, $UO_3$, etc.; $M_2O_5$ oxides, e.g., $V_2O_5$, $Nb_2O_5$, $Ta_2O_5$ etc.; $M_4O_6$ oxides; $M_2O_7$ oxides, e.g., $V_2O_5$, $Nb_2O_5$, $Ta_2O_5$, etc.; $M_4O_6$ oxides; $M_2O_7$ oxides such as $M_2O_7$; complex oxides such as those of the formula $XYO_2$ (X and Y being different metals), e.g., $LiNiO_2$, etc.; $XYO_3$ oxides, e.g., $LiMnO_3$, $FeTiO_3$, $MnTiO_3$, $CoTiO_3$, $NiTiO_3$, $LiNbO_3$, $LiTaO_3$, $NaWO_3$, etc.; $XYO_4$ oxides, e.g., $MgWO_4$, $CdWO_4$, $NiWO_4$, etc.; $XY_2O_6$, e.g., $CaNb_2O_6$ ("Niobite" oxides); $X_2Y_2O_6$, e.g., $Na_2Nb_2O_6$: Spinel structure oxides, i.e., of the formula $X_2YO_4$, e.g., $Na_2MoO_4$, $NaWO_4$, $Ag_2MoO_4$, $Cu_2MoO_4$, $Li_2MoO_4$, $Li_2WO_4$, $Sr_2TiO_4$, $Ca_2MnO_4$, etc.; $XY_2O_4$, e.g., $FeCr_2O_4$, $TiZn_2O_4$, etc.; $X_2YO_5$ oxides, e.g., $Fe_2TiO_5$, $Al_2TiO_5$, etc.; and $X_3Y_3O$ (ternary) oxides. e.g., $Mo_3Fe_3O$, $W_3Fe_3O$, $X_3Ti_3O$ (where X is Mn, Fe, Co, etc.). For a discussion of some complex oxides, see Advanced Inorganic Chemistry, Cotten & Wilkinson, p. 51, (1966), Interscience Publishers, Inc., New York and Progress in Inorganic Chem., Vol. 1, 465 (1959) Interscience Publishers, Inc., New York. Also included are nitrides, and the sulfides corresponding to the above oxides. Hydrates of certain metal oxides may also be used, e.g., $WO_3 \cdot H_2O$, $WO_3 \cdot 2H_2O$, $MoO_3 \cdot H_2O$ and $MoO_3 \cdot 2H_2O$.

A particularly advantageous aspect in the present invention is the use of two separate layers of identical electrochromic materials one layer being employed in the counter-electrode for the other layer. A preferred embodiment consists of tungsten oxide as the electrochromic color electrode and tungsten oxide and graphite as the counter-electrode.

While the general mechanism of persistent electrochromism is unknown, the coloration is observed to occur at the negatively charged electrochromic layer. Generally, the phenomenon of persistent electrochromism is believed to involve cation transport such as hydrogen or lithium ions to the negative electrode where color centers form in the electrochromic image layer as a result of charge compensating electron flow.

When the persistent electrochromic materials are employed as films, thickness desirably will be in the range of from about 0.1–100 microns. However, since a small potential will provide an enormous field strength across very thin films, the latter, i.e., 0.1–10 microns, are preferred over thicker ones. Optinum thickness will also be determined by the nature of the particular compound being laid down as a film and by the film-forming method since the particular compound and film-forming method may place physical (e.g., nonuniform film surface) and economic limitations on manufacture of the devices.

The films may be laid down on any substrate which, relative to the film, is electrically conducting. The electrically conductive material may be coated on another suitable substrate material including glass, wood paper, plastics, plaster, and the like, including transparent, translucent, opaque or other optical quality materials. A preferred embodiment in the instant device would employ at least one transparent electrode.

When tungsten oxide is employed as the electrochromic imaging material and an electric field is applied between the electrodes, a blue coloration of the previously transparent electrochromic layer occurs, i.e., the persistent electrochromic layer becomes absorptive of electromagnetic radiation over a band initially encompassing the red end of the visible spectrum, thereby rendering the imaging layer blue in appearance. Prior to the application of the electric field, the electrochromic imaging layer was essentially non-absorbent and thus transparent.

SPACING LAYER

A semi-solid ion conductive gel may be employed. One embodiment comprises in combination sulfuric acid and a gelling material for the acid. Any gelling gent which is compatible with the other components is suitable. Particularly advantageous gelling agents are polyvinyl alcohol, polyacrylamide, sodium silicate, cabo-sil, and the like.

A preferred embodiment employs $H_2SO_4$ in combination with polyvinyl alcohol. The properties of this gel may be varied in advantageous manner by employing polyvinyl alcohol of various molecular weights, differing sulfuric acid concentration and different polyvinyl alcohol to acid ratios. Thereby, gels can be produced to give a specific conductivity in the range of from about 0.10 to 0.60 ohm$^-$ cm$^{-1}$.

A distinct advantage of the above mentioned gels is their high ionic conductivity and good chemical stability. We have found that both requirements are unexpectedly met by gels in the preferred conductivity range of 0.20 – 0.40 ohm$^{-1}$ cm$^{-1}$.

Other materials may be incorporated into the gel to vary the physical properties of the gel such as viscosity and vapor pressure. Thus, the composition may optionally include organic solvents such as dimethyl formamide, acetonitrile, proprionitrile, butyrolactone and glycerin.

Further, the gels used in the instant invention may be made opaque with, for example, stable, white or colored pigments such as $TiO_2$ or $TiO_2$ doped with Ni, Sb for use in certain electrochromic display device applications. A fluid layer containing an acid may also be used in place of the gel, as disclosed in copending, commonly assigned application Ser. No. 41,154, filed May 25, 1970.

The spacing layer may also be made ionically conductive by a semi-solid material such as a paste, grease or gel containing some ionically conducting materials. The dispersing medium may be one selected from a group consisting of an ionically conductive paste, grease or gel. A preferred embodiment in the present invention comprises the use of a conductive lithium stearate grease containing dispersed therein propylene carbonate and p-toluene sulfonic acid. The semi-solid medium can contain one or more salts selected from Group IA and IIA alkali or alkaline earth materials. Smaller ions such as lithium and sodium are preferred to larger ions as potassium and rubidium since ionic mobility in the electrochromic layer may be a limiting factor. The significant improvements in electrode reversibility and reproducibility and the important advantage of long term stability of operation by use of these gels were unexpected. This is a significant advantage in applications requiring long term service stability. Thus, alpha numeric character presentation and data display devices, wherein the service requirement is staed in years and/or millions of cycles, have become commercially feasible.

BINDING AGENTS

The binding agent for the layers may be any suitable acid resistant binder material which may be cured at ambient or elevated temperatures. Examples are silicates, epoxies, polyesters or polyethylene powders, and the like.

The invention may be better understood by reference to the drawings in which.

Figure 1:
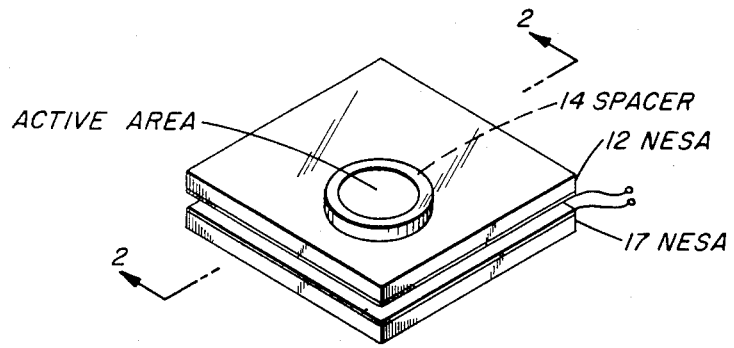
FIG. 1 is a view of an electrochromic device having a coplanar counter-electrode.

Turning now to the drawings, FIG. 1 illustrates a plan view of a device of the present invention showing an electrochromic acid center area and the external electrical leads.

Figure 2:
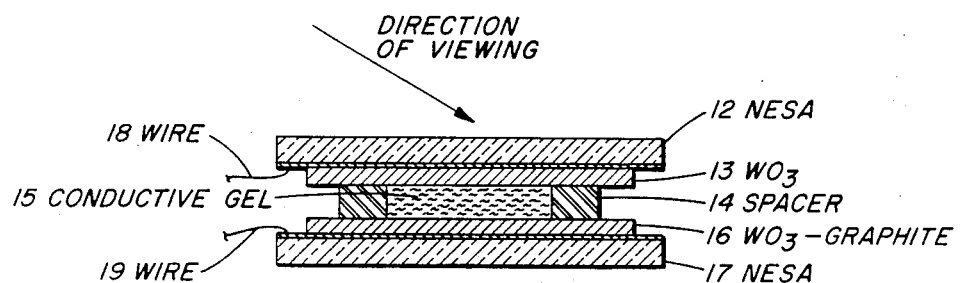
FIG. 2 is a cross-sectional view taken along the lines 2—2 of FIG. 1.

The components of the sandwich device are shown in cross-section view of FIG. 2. The outermost layers 12 and 17 consist of two pieces of transparent substrate containing on their inner surface an electrically conductive coating. The substrate and conductive layer may conveniently be provided as a unit by the use of so-called "NESA" glass, a commercially available product having a transparent coating of conductive tin oxide on one surface of the glass. Deposed thereon and in contact with each conductive tin oxide layer are separate films 13 and 16. Film 13 is the electrochromic layer of tungsten oxide and film 16 is the counter-electrode of graphite or a mixture of graphite and tungsten oxide. Between and in contact with both films there is a center portion of the ion conductive spacing layer enclosed by a circular insulating spacer 14. Electrical contact of the device to the external potential is accomplished by soldered electrical wire connections from the NESA conductive layers. The electrical pathway through the cell is from the tungsten oxide layer, through the ion conductive spacing layer to the tungsten oxide-graphite layer. Because of the possibility of opacity of the conductive medium 15, the configuration of FIG. 1 may permit display of only electrochromic layer 13. Counter-electrode layer 16 located behind conductive layer 15 is hidden from view by the opacity of the conducting medium 15.

Figure 3:
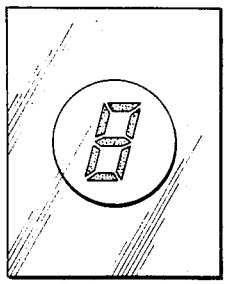
FIG. 3 is a view of seven-bar digital matrix type display, showing a numeral "8."

In FIG. 3, the device has the electrochromic layer deposited as the well-known seven-bar matrix which is shown as displaying the numeral "8." This type of matrix, as is well known in the art, can be used to display any digit from "0" through "9" by coloring the appropriate bars. It will also be obvious that the present invention can be used in formation of "dot matrices" for alpha-numeric and graphic displays.

The following specific examples are given to illustrate the invention further and to show specific embodiments and modes of practice of the invention and are not intended to be limitative. In the examples, a seven-bar matrix, such as shown in FIG. 3, was used as the display, cycling a constant numeral 8, so that all segments were operated for each cycle.

EXAMPLE 1

GRAPHITE ON SUBSTRATE

A counter-electrode was prepared as follows:
Dixon Crucible Co. Graphokote No. 120 was brushed on a clean substrate of NESA glass. Air drying for ½ hour and baking at 300° C. for ½ hour followed. The electrode was cooled to 25° C. and soaked in a solution of glycerin-sulfuric acid 10:1 by volume for 24 hours minimum, rinsed with acetone and baked at 90° C. for ½ hour to dry. The resulting unit weight of graphite was 2 mg./cm².

EXAMPLE 2

GRAPHITE "SALTED" WITH $WO_3$ POWDER

The graphite film was applied to the clean substrate as in Example 1 electrodes except that while the Graphokote 120 film was still wet, $WO_3$ powder was sprinkled onto the surface. The $WO_3$ particles became embedded in the graphite film as the electrode was air dried at 25° C. This step was followed by the 300° C. oven bake acid treatment, rinse and dry mentioned in the Type 1 electrode preparation. The resulting deposit was composed of approximately 0.5 gm./cm² $WO_3$ on 2.0 mg./cm² Graphokote 120.

EXAMPLE 3

GRAPHITE COATED WITH AMMONIUM PARATUNGSTATE

The electrode was prepared as in Example 1 except following the 300° C. bake and cooling period, a solution of 29% $NH_4OH$ saturated with $WO_3$ at 25° C. was brushed onto the graphite film and dried at 25° C. for ½ hour followed by an oven bake at 175° C. for ½ hour. The electrode was cooled to 25° C. and soaked in a solution of glycerin-sulfuric acid 10:1 by volume for 24 hours minimum. This step was followed by a rinse with acetone and baking at 90° C. for ½ hour to dry. Approximately 5 mg./cm² of ammonium paratungstate was added to the 2 mg./cm² of graphite film by this method.

EXAMPLE 4

GRAPHITE — AMMONIUM PARATUNGSTATE MIX

Graphokote 120 suspension was mixed with the saturated solution of $WO_3$ in $NH_4OH$ described in Example 3 electrode in volume ratio of 3 parts Graphokote 120 to 1 part $WO_3$ — $NH_4OH$ mix. The resulting mix was brushed onto the substrate and dried at 25° C. for ½ hour then oven baked at 175° C. for ½ hour. The acid treatment, rinse and dry mentioned in Example 1 electrode preparation followed. The resulting deposit was approximately 3.0 mg./cm² ammonium paratungstate and 2.2 mg./cm² of Graphokote 120.

EXAMPLE 5

GRAPHITE COATED WITH EVAPORATED $WO_3$ FILM

The electrode was prepared as in Example 1 except following the acetone rinse and 90° C. dry step a 1 $\mu$m thick $WO_3$ film was applied to the graphite surface by thermal evaporation in vacuum. Approximately 0.7 mg./cm²$WO_3$ was deposited upon 2 mg./cm² of Graphokote 120.

EXAMPLE 6

GRAPHITE MIXED WITH $WO_3$ POWDER

A mixture was made on a weight basis of 13% graphite (American Cyanamid Co.), 12% $WO_3$ and 75% clear Peterson Co. epoxy paint. The mixture was brushed or sprayed on a clean substrate, air dried at 25° C. for 15 minutes, then oven baked at 70° C. for 1 hour. The resulting deposit weight is 2 mg./cm² including 0.5 mg./cm² $WO_3$, 0.5 mg./cm² graphite (American Cyanamid Co.) and 1.0 mg./cm² epoxy. This electrode has the advantage of being cured at low temperatures, thus permitting common plastics to be used as substrates.

EXAMPLE 7

An electrochromic device was constructed from two NESA glass plates. One conductive NESA plate was coated with a 0.5 micron thick evaporated film of tungsten oxide. The other NESA plate was a counter-electrode as in Example 2. The glass plates so formed were pressed together with the electrochromic and graphite films facing each other but separated by a 0.6 mm. thick sealing ring and spacer which retained an ionically conductive paste consisting of a $TiO_2$ pigment in a 1:10 ratio of concentrated sulfuric acid and glycerin. This device was cycled from color to clear and back to color at an applied potential of 1.1 volts D.C. with half cycles of one second. The device underwent 300,000 cycles of switching at 10 cycles per minute without observable deterioration.

EXAMPLE 8

The procedure of Example 7 was repeated in every detail except the NESA-graphite-counter-electrode of Example 3 was used. This device was cycled from color to clear and back to color at an applied potential of 1.1 volts D.C. with half cycles of 1 second. The device underwent 500,000 cycles of switching at 10 cycles per minute without observable deterioration.

EXAMPLE 9

This electrochromic device was constructed from a NESA glass plate and a stainless steel plate. The conductive NESA plate was coated with a 1.0 micron thick evaporated film of tungsten oxide. A type 316 stainless steel plate was used as the conductive substrate in the preparation of a counter-electrode as in Example 3. The electrodes so formed were pressed together with the electrochromic and graphite films facing each other but separated by a 0.6 mm. thick sealing ring and spacer which retained an ionically conductive paste consisting of a $TiO_2$ pigment in a 1:10 ratio of concentrated sulfuric acid and glycerin. This device was cycled from color to clear at a potential of 1.35 volts D.C. and from clear to color at 1.15 volts D.C. with half cycles of 0.5 second. The device underwent 500,000 cycles of switching at 10 cycles per minute without observable deterioration.

We claim:

1. A variable light transmission device which comprises in layered arrangement, a persistent electrochromic material, and a bonded graphite counter-electrode separated by an ion conducting separating layer, said layers being deposed between a pair of conductive electrodes.

2. The device of claim 1, wherein said bonded counter-electrode includes an additional material which is the same as the persistent electrochromic material.

3. The device of claim 2, wherein the electrochromic materials in each said layer are identical.

4. The device of claim 2 wherein said persistent electrochromic material is tungstic oxide.

5. The device of claim 1, wherein at least one of the electrodes is substantially transparent.

6. The device of claim 1 wherein said persistent electrochromic material is tungstic oxide.

7. The device of claim 1 wherein said ion conducting layer contains sulfuric acid.

* * * * *